Patented Mar. 12, 1935

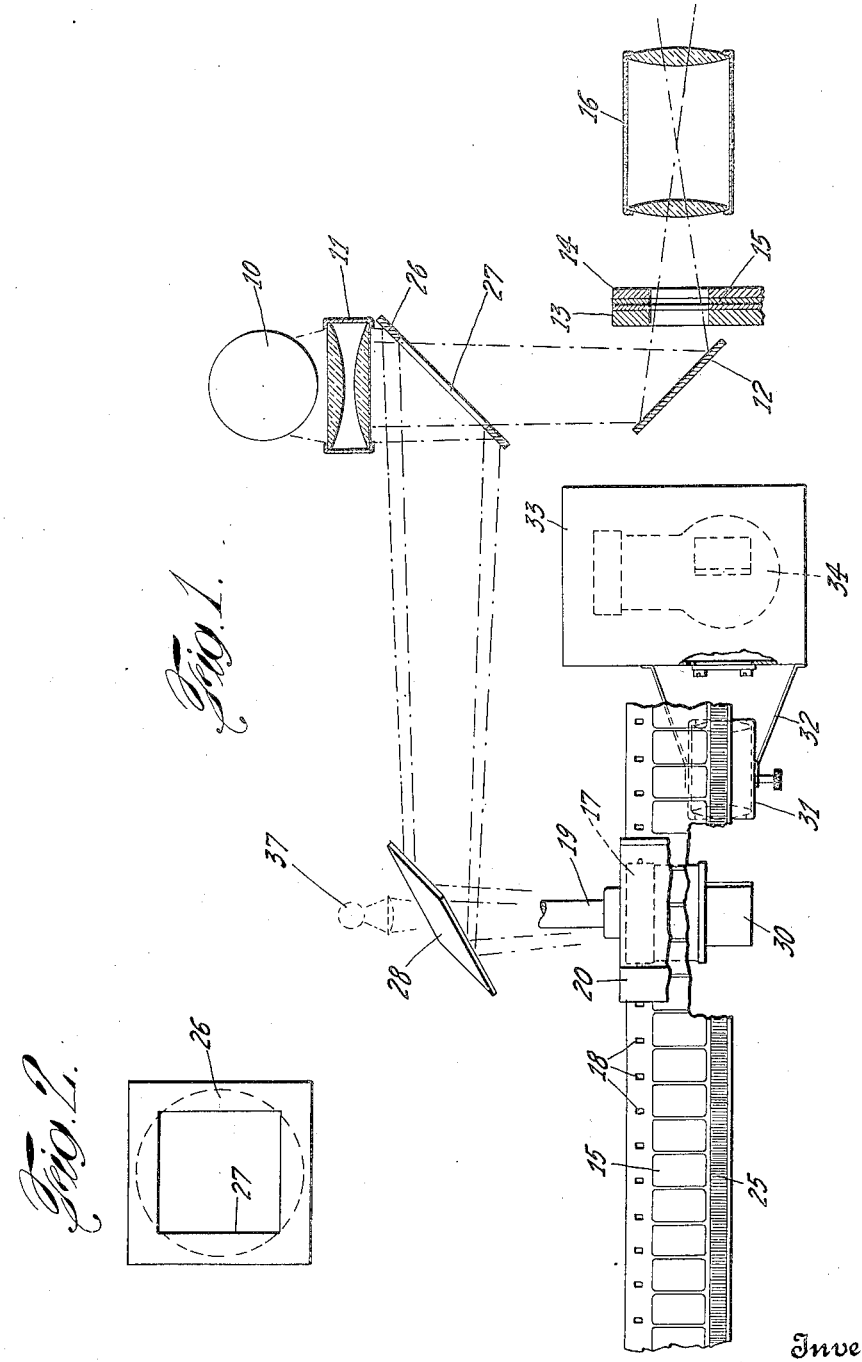

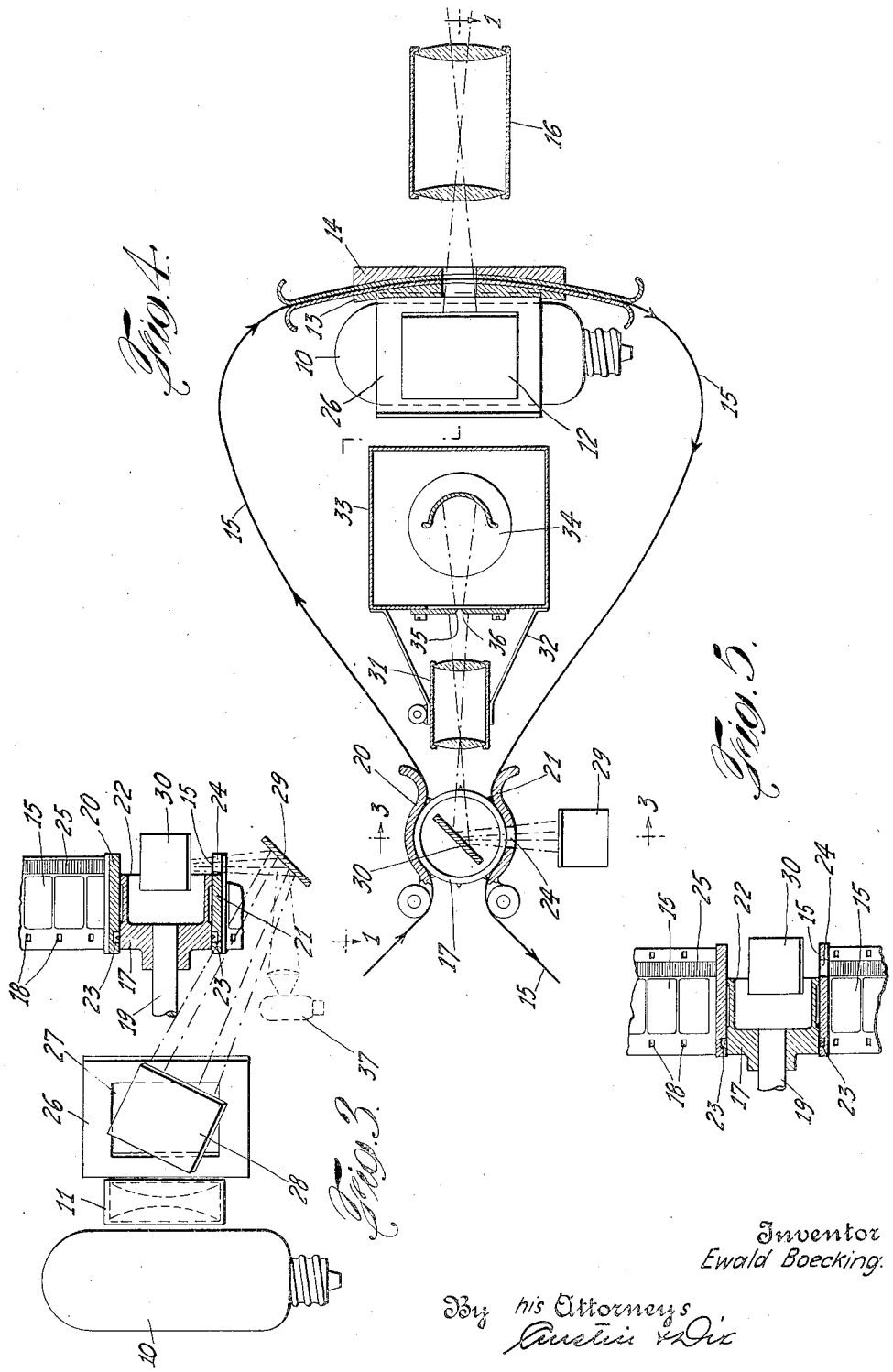

1,993,770

UNITED STATES PATENT OFFICE 1,993,770

PICTURE AND SOUND PROJECTION APPARATUS

Ewald Boecking, Brooklyn, N. Y., assignor to International Projector Corporation, New York, N. Y., a corporation of Delaware Application March 14, 1931, Serial No. 522,732

5 Claims. (Cl. 88—16.2)

This invention relates to new and useful means in sound apparatus and has especial reference to apparatus capable of being used in motion picture projection machines whereby production of sound simultaneous with the projection of pictures is intended.

A main object of the invention is to provide an efficient compact arrangement of sound reproducing device, which make the unit as a whole especially adaptable for use in small projectors, such as those now being used by amateurs in the home for the 16 m.m. film.

Another object is to provide a simple and efficient apparatus whereby the same light which is used to project the pictures may also be used to project the sound beam.

A further object of the invention is to provide a combination of a light, a film, a photo-electric cell and a combination of mirrors or reflectors whereby the one light may project pictures and produce a sound beam and the entire arrangement is disposed in such physical relation that the unit occupies a very minimum of space so that in amateur projectors the bulk of the apparatus is not unduly increased.

Further and more specific objects, features and advantages will more clearly appear from a consideration of the specification hereinafter taken in connection with the accompanying drawings which form part of the specification and which illustrate a present preferred form of the invention.

The invention, in brief, contemplates the disposition in one general line of the main film gate and lens combination for projecting the picture, together with the photo-electric cell casing together with means for holding and running the film past the beam of light in such manner that the light is projected to pass therethrough on a mirror to then be reflected into the photo-electric cell casing.

To one side of this aligned apparatus is preferably disposed a projection lamp in combination with a series of light reflecting means so as to take part of the beam of light from the projection lamp and project it through the film picture sections for producing a picture on the screen. At the same time reflector means is employed to divert part of the passing projection beam preferably by means of one or more mirrors to cause the light to pass through the first sound unit at a point removed from the main film gate so as to fall upon the sound track of the film and thereafter be reflected or thrown onto the photo-electric cell.

More particularly the invention comprises a simple, compact form of sound unit which comprises a rotatable sprocket acting as a sound film gate, with associated saddles, and means for permitting exposure of the sound track of the film as it passes over this sprocket and in further combination with a reflector disposed between the saddles to receive light thrown through the sound track of the film and pass it to the photo-electric cell.

The present preferred form of the invention is shown in the drawings, of which:

Fig. 1 is a somewhat diagrammatic sectional view of the apparatus, as taken on the section line 1—1 of Fig. 4;

Fig. 2 is an elevation of one of the reflector plates;

Fig. 3 is a transverse section taken on the line 3—3 of Fig. 4;

Fig. 4 is a vertical longitudinal sectional view in part taken through the apparatus; and Fig. 5 is a section through a modified form of the apparatus.

The preferred form of the invention shown is adapted especially to be used in a motion picture apparatus where sound is simultaneously produced with the projection of pictures and is adapted for those forms of apparatus which produce sound by photo-electric transformation into sound of sound images or striae formed on the film and along what is known as the sound track.

The ordinary sound unit comprises a lamp, suitable lens combinations, a gate through which the film passes, said gate having an opening aligned with the sound track and the film to permit the light beam from the lamp to pass through the sound track. The film includes a desired number of stria images and is suitably manipulated to fall onto any desired form of photo-electric cell whereby electrical impulses are created in the cell and thereafter transformed into sound waves by suitable electrical amplifiers.

In the drawing the invention in the preferred form contemplates the use of the ordinary projection lamp for the projection of pictures as well as for the formation of the sound beam, whereas heretofore a separate lamp has been used for the sound beam. The invention is not, however, to be limited to a single light source, but may have two lights, if desired.

As shown in the drawings, the combination of elements constituting the preferred form of the improved apparatus includes a projection lamp 10 associated with a suitable lens combination or condenser unit 11. The beam passing through the condenser projects forward and falls partly on a light reflecting means such as mirror 12 disposed preferably at a 45° angle to the beam from which the beam is thrown through the film gate formed by the gate 13 and door 14 and through the picture section of a film 15 passing through the gate thence the beam passes through the ordinary lens combination 16 and thence travels to the screen.

As shown particularly in Fig. 4, the film 15 before it passes through the main film gate is adapted to pass over a sprocket 17. This sprocket has, preferably, one row of teeth thereon to connect with the sprocket holes 18 along one side of the film 15. The sprocket is mounted on a shaft 19 which is actuated in any desired manner. Preferably above and below the sprocket are disposed curved saddle plates 20 and 21. These plates constitute guides for the film, since the film passes between the sprocket 17 and these respective saddles as shown in Fig. 4. The saddle plates 20 and 21 and the sprocket 17 form a sound film gate. In the usual movement of the film it passes between the saddle 20 and the sprocket 17 before it passes through the main film gate and after leaving the main film gate passes between the saddle plate 21 and the sprocket 17. Any suitable type of intermittent movement or other type of movement may be employed to pass the film through the gate 13. The sprocket 17 is usually run at uniform speed. Preferably this sprocket is in the form of a circular flange or wall 22 extending downwardly from the main body of the sprocket acting as a bearing shaft for the film. The saddle plates are provided with suitable curved slots or grooves 23 to allow for the movement therein of the teeth on the sprocket 17.

The lower saddle is preferably provided with an aperture 24 for the passage of light therethrough onto the film and this hole is disposed in that portion of the saddle which lies adjacent that part of the film 15 occupied by the sound track 25.

In the preferred form of the improved apparatus there is disposed in front of the projection lamp 10 a mirror or other form of light reflecting means, shown in the form of a rectangular plate 26 having a substantial opening 27 therein thus leaving a rim-like rectangular portion acting as a reflector surface. This plate is so disposed in the beam from the lamp 10 that it receives and reflects the beam in a right angle direction to a second mirror or reflector plate 28. This second reflector plate receives this entire beam and throws it as is shown in Fig. 3 onto a third mirror or reflector 29 disposed preferably beneath the sprocket 17 and the lower saddle which is shown at 21. The reflector 29 is in such position as to reflect its beam upwardly through the aperture 24 in the lower saddle and thus this beam passes through the sound track of the film 15. The beam bearing image of the desired number of striae is received on another reflector or mirror 30 located immediately above the sound track of the film within the cut-out portion of the sprocket 17 but so disposed relative thereto that a beam projected from the reflector 30 will clear the edge of the sprocket and be thrown forward through a lens combination 31 mounted in any suitable supporting means such for instance as on the end of a hood 32 fastened to the front of a casing 33 containing the photo-electric cell 34. This casing 33 is provided with adjustable plates 35 and 36 on its front face which have adjacent edges preferably bevelled to form a narrow slit or opening through which the desired strip of the sound beam may be permitted to pass. When these plates are disposed close together only a single sound stria may pass through. Otherwise there may be adjustment to pass a wider strip containing portions or all of other sound striae. These plates and their combination with the cell and the casing and other elements are more specifically described and claimed in my co-pending application Serial Number 522,731 filed March 14, 1931, entitled Sound reproducing equipment.

By means of this construction and combination of elements the same lamp used to project the pictures may be employed to project the sound beam. If desired, however, as shown in Fig. 3, a very small lamp such as 37 may be disposed horizontally opposite the reflector 29 to form the sound light thus eliminating the necessity of using reflectors 26 and 28, but it is possible to employ the single lamp for both purposes.

In Fig. 3 the film only has one row of sprocket holes with a sound track of full width. In Fig. 5 the film is provided with a double row of sprocket holes in a narrower sound track. Although this last size of film is larger the back edge thereof is nevertheless held firmly in position by reason of the fact that the width of the sprocket 17 is ample to maintain a substantial grip on the film between the sprocket and the respective saddles. It is apparent, however, that light may be reflected from the light source 10 into the mirrors 28 by an additional or other reflector than the mirror 26, if desired.

It will be observed that this invention, therefore, comprises a simple, compact, efficient combination of elements whereby the projection beam and the sound beam are produced from one light source, although the line of the projection beam is distinct and separated from that of the sound beam and the respective beams pass through entirely different combinations of elements in the apparatus. The direction and control of the sound beam is such as to make the apparatus capable of being disposed in a compact space and requiring a minimum number of combinations to effect the desired result. It will be noticed that in Fig. 1 the sound unit and its associated parts are disposed right in back of and in line with the main film gate and the main lens combination, so that the space occupied is used to the best advantage to produce a compact arrangement of parts. It will also be noticed that the light sources are sufficiently removed from the film to avoid any detrimental effects thereon and the beams issuing from the lamp are so handled and controlled as to not require too great a size of enclosing casing. The adjustment of the size of the slit through which the sound light beam passes to the photo-electric cell is adjustable by means of the plates 35 and 36 and the amount of light falling on this cell can be increased or decreased by the adjustment of the lens combination 31. This permits a simple and accurate means for easily determining the strength and area of light falling on the cell whether that area include only one sound stria or several.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In a motion picture apparatus, a film picture gate, a reflector disposed back of said gate, a sound element disposed back of said reflector and aligned with said gate, a sound film gate spaced from the first gate and aligned with the sound element, a second reflector disposed within said sound film gate to throw light into the sound element, a source of light and reflecting means for throwing light from said source through both of said gates simultaneously.

2. In a motion picture apparatus, a film picture gate, a reflector disposed back of said gate, a sound element disposed back of said reflector and aligned with said gate, a sound film gate spaced from the first gate and aligned with the sound element, a second reflector disposed within said sound film gate to throw light into the sound element, a source of light and reflecting means for throwing light from said source through both of said gates simultaneously, the film passing in a substantially closed, curved path between said gates and enclosing said aligned apparatus therewithin.

3. In a motion picture projector, a projection film gate, a sound element aligned axially therewith, a sound film gate aligned with the sound element, a projection light disposed to one side of said aligned apparatus, the film passing between said gates in a substantially closed, curved path and enclosing said aligned apparatus, reflector means associated with the first gate to receive light from said source and throw it through the projection film gate, and additional reflector means to receive light from said source and throw it through the sound film gate.

4. In a motion picture projector, a projection film gate, a sound element aligned axially therewith, a sound film gate aligned with the sound element, a projection light disposed to one side of said aligned apparatus, the film passing between said gates in a substantially closed, curved path and enclosing said aligned apparatus, reflector means associated with the projection gate to receive light from said source and throw it through the projection film gate, and additional reflector means to receive light from said source and throw it to the sound film gate, and a mirror associated with the sound film gate to throw the light passed to the sound film gate, into the sound element.

5. In a motion picture apparatus, a projection film gate having an aperture by which the picture sections of the film pass, a projection light disposed laterally of said gate, a mirror back of said gate to receive light from said source and throw it through the film passing said projection gate, and a sound element back of said mirror and aligned with the projection gate, a sound film gate spaced from the first gate and aligned with the sound element, said sound gate having an aperture by which the sound track of the film passes, a mirror associated with and disposed within said sound film gate and adapted to receive light and throw it into the sound element and reflector elements to divert part of the beam from the light source and throw it on said mirror associated with the sound film gate.

EWALD BOECKING.